United States Patent
Turner

[15] 3,699,439
[45] Oct. 17, 1972

[54] ELECTRICAL PROBE-POSITION RESPONSIVE APPARATUS AND METHOD

[72] Inventor: John A. Turner, Colchester, England

[73] Assignee: Automatic Radio Manufacturing Inc., Melrose, Mass.

[22] Filed: March 10, 1970

[21] Appl. No.: 18,174

[30] Foreign Application Priority Data

March 13, 1969 Great Britain..........13,341/69

[52] U.S. Cl. ..................324/71 R, 33/1 M, 178/18, 324/71 EB
[51] Int. Cl. ...........................................G01n 27/00
[58] Field of Search....324/71 EB, 62.65, 71; 178/18, 178/19, 20; 33/1 M

[56] References Cited

UNITED STATES PATENTS

| 2,900,446 | 8/1959 | McLaughlin | 178/18 |
| 3,032,609 | 5/1962 | Fluhr et al. | 178/18 |
| 3,152,238 | 10/1964 | Anderson | 324/71 EB |
| 3,207,902 | 9/1965 | Sandborg | 324/71 EB |
| 3,423,528 | 1/1969 | Bradshaw et al. | 178/19 |
| 3,524,998 | 8/1970 | Gilbert | 307/299 |
| 3,541,439 | 11/1970 | Shriver | 324/71 EB |

FOREIGN PATENTS OR APPLICATIONS 1,133,757   11/1968   Great Britain............324/71

OTHER PUBLICATIONS

Bradshaw, R. D. and Jensen, H. H. Electrographic Data Sensing. in IBM Technical Disclosure Bulletin, Vol. 9, No. 1 1966 TK 7800 I. 13. pp. 35– 36.

Primary Examiner—Stanley T. Krawczewicz
Attorney—Mason, Mason & Albright

[57] ABSTRACT

Position responsive apparatus is disclosed comprising a sheet of substantially uniform resistivity having first and second parallel, linear electrodes in electrical contact therewith. A movable, electrically conductive probe is energized from one pole of a current source whose other pole is connected to the two electrodes in parallel. Means are provided for comparing the current flowing through one electrode, when the probe is in contact with the surface, with the current flowing through the other electrode or with the total current. It is found that the ratio of the current through the first electrode to the current through the second electrode corresponds to the ratio of the distance of the probe contact point from the second electrode to the distance of the said point from the first electrode. A second pair of linear electrodes, arranged perpendicular to the first pair so as to form therewith the four sides of a square, may be provided. If the second pair of electrodes are energized, with respect to the probe, in the same manner as the first pair but alternately therewith, then x and y co-ordinates of the point of contact between the probe and the surface may be produced.

12 Claims, 4 Drawing Figures

PATENTED OCT 17 1972

INVENTOR
JOHN A. TURNER

ELECTRICAL PROBE-POSITION RESPONSIVE APPARATUS AND METHOD

The invention relates to position responsive apparatus in which an electrical signal is produced which is related to the position of a movable point in an extended region, and to methods of determining the position of a movable point in an extended region.

According to the invention, there is provided position responsive apparatus, comprising two electrode means spaced apart on and in electrical contact with a surface having substantially uniform electrical resistivity, probe means for making electrical contact with the surface at a point between the electrodes, an electrical current source connected to the probe means whereby to provide two parallel circuit paths through the said point, each path including a respective one, only, of the electrode means, and output means connected to measure the current in at least one of the circuit paths whereby the said current is dependent on the position of the said point relative to the electrode means.

According to the invention, there is provided position responsive apparatus, comprising a surface having substantially uniform electrical resistivity, a first pair of electrode means spaced apart and each making electrical contact with the surface along a respective first line thereon, the two first lines extending in substantially the same direction, a second pair of electrode means each making electrical contact with the said surface along a respective second line, these two second lines extending in the same direction, the direction of extension of the first lines being substantially perpendicular to the direction of extension of the second lines, probe means for making electrical contact with the surface at a point between the electrode means, and means operative to establish first and second pairs of circuit paths successively, each circuit path including the said point, each of the first pair of circuit paths including a respective one of the first electrode means and excluding the other three electrode means, and each of the second pair of circuit paths including a respective one of the second electrode means and excluding the other three electrodes, whereby when the circuit paths are energized the ratio of the electric currents in the first circuit paths is indicative of the position of the said point relative to the first pair of electrode means and the ratio of the electric currents in the second circuit paths is indicative of the position of the point relative to the second pair of electrode means.

According to the invention, there is further provided a method of determining the position of a movable point of contact between probe means and a surface of substantially uniform resistivity having a pair of electrode means spaced apart thereon and in electrical contact therewith, comprising the steps of connecting an electric current source between the two electrode means on the one hand and the probe means on the other hand, and measuring the current flowing through at least one of the two electrode means whereby the ratio of the current through one electrode means to the current through the other electrode means corresponds to the ratio of the distance of the said point from the other electrode means to the distance of the said point from the said one electrode means.

Position responsive apparatus embodying the invention and methods of determining the position of a movable point in accordance with the invention, will now be described by way of example only and with reference to the accompanying drawings in which.

Figure 1:
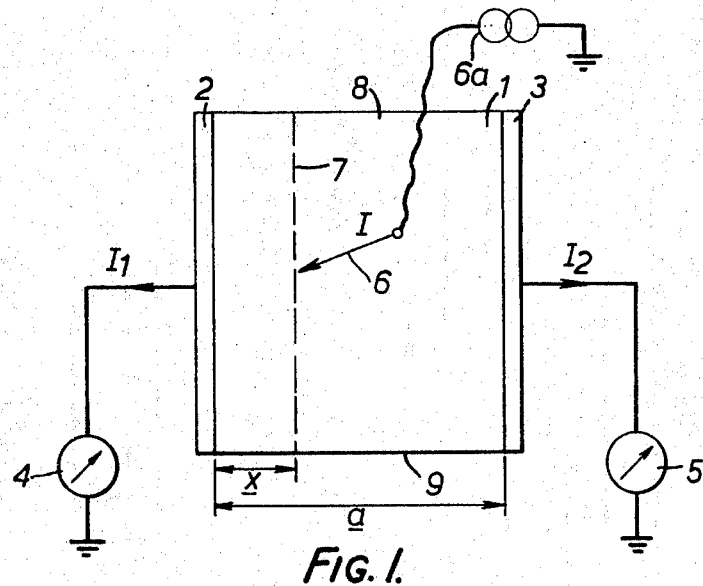
FIG. 1 is a diagrammatic representation of one form of the apparatus.

Referring to FIG. 1, a sheet 1 of substantially uniformly resistive material has attached to it two high conductivity parallel electrodes 2 and 3 respectively. The electrodes 2 and 3 are connected to earth through ammeters 4 and 5. A probe 6 enables a current I to be injected into the sheet 1 from a source 6a connected between the probe 6 and earth. If the probe 6 is tracked along a line 7 which is parallel to both the electrodes 2 and 3 and then it can be shown both experimentally and theoretically that the currents $I_1$ and $I_2$ measured by the ammeters 4 and 5 respectively, assuming the resistances of the ammeters to be negligible, are constant and also that $I_2 = xI/a$ where $x$ is the perpendicular distance from the electrode 2 of the point at which the current $I$ was injected into the sheet 1, and $a$ is the total separation of the electrodes 2 and 3.

Thus if $I$ is constant, the current $I_2$ is proportional to the distance $x$ and similarly the current $I_1$ is proportional to the distance $(a - x)$. If the current $I$ is not of a constant magnitude then the ratio of the currents $I_2$ and $I$, which is independent of the magnitude of $I$, is also proportional to the distance $x$; thus there is given an analogue indication of the perpendicular distance of the point from the electrode 2. It is apparent that if a second pair of electrodes is provided along the edges 8 and 9 of the sheet 1 with electrodes 2 and 3 removed, then similarly an indication of the position of the probe 6 perpendicular to these further electrodes can be obtained. However the indications of the X and Y positions can only be obtained sequentially and not simultaneously.

Figure 2:
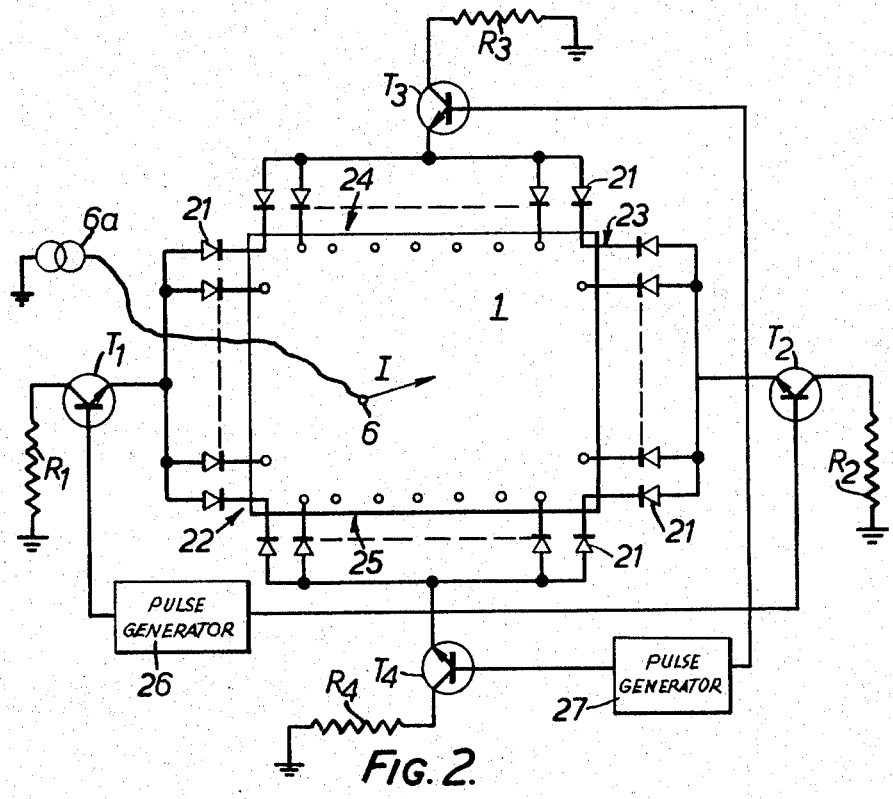
FIG. 2 is a diagrammatic representation of a further form of the apparatus.
Figure 3:
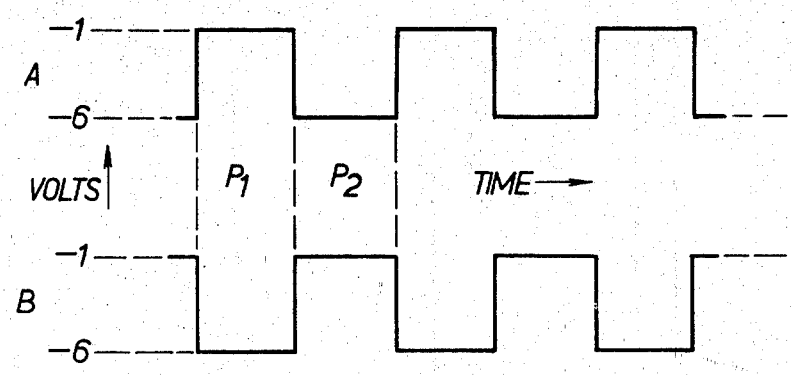
FIG. 3 shows waveforms applied to the apparatus of FIG. 2.

FIGS. 2 and 3 show apparatus which is capable of giving such an X-Y indication of position. Instead of using continuous electrodes such as the electrodes 2 and 3 of FIG. 1, there is provided a series of identical diodes 21 connected so as to form four electrode means 22, 23, 24 and 25 respectively effectively distributed along the edges of the sheet 1. For each of the electrode means 22 to 25, the anodes of the diodes are connected together and the cathodes are connected to a series of points uniformly spaced along the respective edges of the sheet 1. The conduction of the diodes 21 forming the electrode means 22, 23, 24 and 25 is controlled by gating transistors $T_1$, $T_2$, $T_3$ and $T_4$ respectively which are connected through resistors $R_1$, $R_2$, $R_3$ and $R_4$ to earth.

The current $I$ flowing through the probe 6 is derived from a source 6a which is poled to forward-bias all the diodes 21. Gating pulses having the waveforms A and B shown in FIG. 3 and generated by pulse generators 26 and 27 respectively are applied respectively to the transistor pairs $T_1$, $T_2$ and $T_3$, $T_4$ of the gating transistors $T_1$, $T_2$, $T_3$ and $T_4$. During period $P_1$, transistors $T_1$ and $T_2$ conduct whereas transistors $T_3$ and $T_4$ are cut off and the current *I* is therefore constrained to flow in the direction controlled by transistors $T_1$ and $T_2$. An output signal proportional to the horizontal position, that is the distance from the electrode means 22, of the probe 6 appears as the mean or peak current flowing in the resistor $R_2$ (or as the mean or peak voltage appearing across the resistor $R_2$). During period $P_2$, the transistors $T_3$ and $T_4$ conduct whereas the transistors $T_1$ and $T_2$ are cut off. An output signal proportional to the vertical position, that is the distance from the electrode means 25, of the probe 6 appears as the mean or peak current in the resistor $R_3$ or the mean or peak voltage across the resistor $R_3$.

As explained, the manner in which the current *I* divides between the respective electrode means of each pair is a function of the position of the probe 6. The linearity of this division of current is dependent upon the extent to which each of the pairs of electrode means 22, 23 and 24, 25 is maintained at a constant potential while its respective diodes 21 are conducting, and also the extent to which the other electrode means are unaffected by the connections to their respective reversed biased diodes 21. In practice it has been found that the linearity of the division is better than one per cent for a system having an area 20 × 12 cm. and in which the connections to the diodes 21 are spaced by 12 mm. from one another, provided that the probe 6 is not positioned closer than 10 mm. from any of the points of contact of the diodes 21.

The gating transistors $T_1$, $T_2$, $T_3$ and $T_4$ can be switched at a high frequency so as to give virtually simultaneous signals for both X and Y co-ordinates of the position of the probe 6. Alternatively, the gating transistors $T_1$, $T_2$, $T_3$ and $T_4$ can be omitted, the diodes 21 forming one pair of the electrode means being connected in the opposite sense and the source 6a replaced by a source providing alternate magnitudes $-I$ and $+I$. As the source is alternating, the electrical contact between the probe and the surface 1 may be made through capacitive coupling. For example, the surface may be covered with a dielectric sheet with which the probe makes physical contact, the capacitive coupling through the sheet providing electrical contact between the probe and the surface.

The apparatus of FIG. 1 may be operated with an a.c. source 6a instead of a d.c. source. In an a.c. source is used, then the electrical contact between the probe and the surface may be made through capacitive coupling and not by direct physical contact. For example, the surface 1 may be covered with a dielectric sheet as described above.

The apparatus described with reference to FIGS. 2 and 3 is suited to form an electrographic tablet and the resistive area can be made of a hard wearing material such as a conductive plastics material or a conductive ceramic known as Cermet or a resistive paper such as Teledeltos paper.

Instead, the resistive area can be provided on the screen of a cathode ray tube either on the inner surface of the tube between the phosphor and the tube surface, or on the side of the phosphor opposite to the tube surface. The resistive area can be provided on the inner surface of the tube by depositing a layer of indium oxide and/or tin oxide or other transparent conductive material, or, on the side of the phosphor opposite to the tube surface, by depositing aluminum or other material substantially transparent to electrons.

Figure 4:
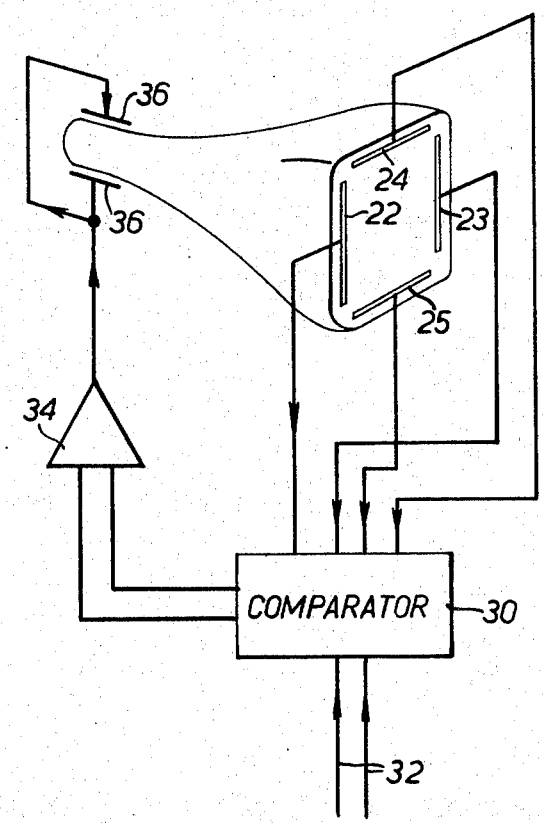
FIG. 4 shows a block diagram of a servo system employing the apparatus of FIG. 2.

In such an arrangement, the probe 6 is constituted by the electron beam of the tube. In this case the position information may be fed back to the beam deflection system of the cathode ray tube to provide an accurate control of the position of impact of the electron beam upon the screen. FIG. 4 shows such an arrangement. The four electrode means 22 to 24 are shown connected to a comparator 30 which contains the transistors $T_1$ to $T_4$ and their associated pulse generators 26 and 27 and which measures the *x* and *y* co-ordinates of the beam in the manner explained in connection with FIG. 2. The comparator 30 compares these co-ordinates with reference co-ordinates represented by deflection signals fed in on lines 32. Any difference causes a correction signal to be applied to an amplifier 34 which energizes the beam deflection control 36 in such a manner as to bring the beam back to the desired point.

It will be seen that by measuring the current through one electrode means as a ratio of the current through the other or of the total current, the apparatus shown in the various Figures is advantageous over apparatus in which a voltage gradient is maintained across the surface by applying a potential difference between the electrodes; in the latter apparatus, the voltage picked up by a probe contacting the surface depends on the contact resistance. If this resistance is high, a.c. pick-up may cause trouble. In the apparatus described and illustrated, unwanted a.c. pick-up is negligible since the system operates at low impedance. The apparatus described and illustrated is also advantageous in that readings representing *x* and *y* coordinates of the point of electrical contact are produced (as in the case of FIG. 2), at different terminals. Since the apparatus described and illustrated requires the probe to act as a current source, it is particularly suitable for use with a cathode ray tube as described in connection with FIG. 4 with the beam acting as the current source. The beam could clearly not serve as the probe in apparatus where a voltage gradient is set up between the electrodes and the probe is required to pick off a voltage from the surface.

What is claimed is:

1. Position responsive apparatus, comprising
means defining a rectangular surface having substantially uniform electrical resistivity,
two electrode means each in electrical contact with the surface at points extending completely along a respective one of two opposite edges thereof so as to maintain each of the two said edges at a substantially uniform electrical potential,
two further electrode means along said other two edges,
movable probe means for making electrical connection with the surface at a point between the first-mentioned two electrode means,
electrical connection means interconnecting the probe means and the electrode means so as to provide a pair of parallel circuit paths through the said point of connection between the probe means and the surface and to hold both of the electrode means at the same electrical potential while maintaining the other two electrode means of the surface unconnected, each path including a respective one, only, of the first mentioned two electrode means, a single electrical current source connected to drive a current through the two circuit paths via the probe means and the said point of connection between the probe means and the surface so that the current divides between the first mentioned two electrode means in inverse proportion to the distance of that point from each of the first mentioned two electrode means, and output means connected to measure the current flowing in at least one of the paths.

2. Apparatus according to claim 1, in which the probe means comprises a member made of electrically conductive material.

3. Apparatus according to claim 1, in which the source is an a.c. source and including a layer of electrically insulating material over the said surface, the probe means making electrical connection with the surface by capacitive coupling through the layer.

4. Apparatus according to claim 1, in which each electrode means makes electrical contact with the said surface at discrete points along the respective said edge, the discrete points being sufficiently close that each of the said two edges is at substantially uniform electrical potential.

5. Apparatus according to claim 4, wherein
said two further electrode means are each in contact with the said surface at points extending completely along a respective one of the said other two edges of the surface so as to maintain each of those other two edges at a substantially uniform electrical potential, further electrical connection means interconnecting the probe means and the two further electrode means so as to provide a further pair of parallel circuit paths through the said point of connection between the probe means and the surface and to hold both of the further electrode means at the same electrical potential, each further path including a respective one, only, of the further electrode means and excluding the first-mentioned electrode means, the said source being connected to drive current through the two further circuit paths via the probe means and the said point of connection thereof to the surface so that the current divides between the two further electrode means in inverse pro-portion to the distance of that point from each of the electrode means, means for rendering the two pairs of electrical connection means non-conductive successively whereby the two pairs of circuit paths are established alternately, and the output means being connected to measure the current in at least one of the further circuit paths.

6. Apparatus according to claim 5, in which the electrical connection means include first and second switch means respectively connected in circuit with the pairs of circuit paths, the said means for rendering the two pairs of electrical connection means non-conductive successively including means arranged to operate the first and second switch means alternately.

7. Apparatus according to claim 5, in which the means for rendering the two pairs of electrical connection means non-conductive successively comprises diode means connected in circuit with the respective circuit paths, and in which the polarity of the said current source periodically changes, the diode means being so poled that when the source has one polarity the diode means of the first mentioned pair of electrode means are forward-biased and the other diode means are back-biased and when the source has the opposite polarity the diode means of the further electrode means are forward-biased and the other diode means are back-biased.

8. Apparatus according to claim 5, including
means operative to produce control signals indicative of a desired position of the said point,
means responsive to the currents in the said circuit paths and to the control signals to compare the position of the said point with the desired position whereby to produce a correction signal when the point diverges from the said desired position, and
probe control means responsive to the control signal to automatically adjust the position of the probe means whereby to tend to maintain the point in the desired position.

9. Apparatus according to claim 8, in which the probe means comprises an electron beam of a cathode ray tube on whose screen the said surface is provided.

10. A method of determining the position of a movable point of electrical connection between probe means and a rectangular surface of substantially uniform electrical resistivity having two pairs of electrode means each said pair respectively making electrical contact with points extending completely along two opposite edges of the said surface so as to maintain each said opposite edge at a substantially uniform electrical potential, comprising the steps of connecting an electric current source between one pair of said electrode means on the one hand and the probe means on the other hand while holding said one pair of electrode means at the same electrical potential and maintaining the other pair of said electrode means along the edges of the rectangular surface unconnected, and measuring the current flowing through at least one of said one pair of electrode means whereby the ratio of the current through said one electrode means to the current through the other electrode means of said one pair corresponds to the ratio of the distance of the said movable point from said other electrode means to the distance of the said movable point from the said one electrode means.

11. A method of determining the position of a movable point of electrical connection between probe means and a rectangular surface of substantially uniform electrical resistivity having a pair of first electrode means respectively making electrical contact with points extending completely along two opposite edges of the rectangular surface so as to maintain each of those edges at substantially uniform electrical potential, and a further pair of electrode means respectively making electrical contact with points extending completely along the other two opposite edges of the rectangular surface so as to maintain each of those edges at substantially uniform electrical potential, said method comprising the steps of:

connecting an electric current source between the two first electrode means on the one hand and the probe means on the other hand while maintaining the two first electrode means at the same potential and maintaining the two further electrode means unconnected, connecting the said current source between the two further electrode means on the one hand and the probe means on the other hand while maintaining the two further electrode means at the same potential, this step being carried out after disconnection of the current source from the first electrode means, measuring the current flowing through at least one of each pair of electrode means when the said current source is connected thereto and the other pair of electrode means is unconnected, whereby the ratio of the current through one of these electrode means to the current through the other thereof corresponds to the ratio of the distance of the said movable point from the said other thereof to the distance of the said movable point from the said one thereof.

12. A method of determining the position of a movable point on a rectangular surface of substantially uniform electrical resistivity having electrode means along each edge of the rectangle, comprising the steps of injecting an electric current into the surface at the said movable point from a single current source, holding one pair of electrode means at opposite edges of the surface substantially completely at the same electrical potential, while holding the other pair of electrode means at opposite edges electrically unconnected, so that the injected current divides and flows to and through the two edges of the said one pair in inverse proportion to the distance of the said movable point from each edge of the said one pair, and comparing the currents flowing through each edge of the said one pair.

* * * * *